US 9,967,033 B2

(12) United States Patent
Cheng et al.

(10) Patent No.: US 9,967,033 B2
(45) Date of Patent: May 8, 2018

(54) FLEXIBLE TWDM PON WITH LOAD BALANCING AND POWER SAVING

(71) Applicant: Futurewei Technologies, Inc., Plano, TX (US)

(72) Inventors: Ning Cheng, Santa Clara, CA (US); Frank J. Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days. days.

(21) Appl. No.: 15/234,680

(22) Filed: Aug. 11, 2016

(65) Prior Publication Data

US 2016/0352428 A1    Dec. 1, 2016

Related U.S. Application Data

(63) Continuation of application No. 14/257,458, filed on Apr. 21, 2014, now Pat. No. 9,425,918.

(60) Provisional application No. 61/814,085, filed on Apr. 19, 2013.

(51) Int. Cl.
*H04B 10/27* (2013.01)
*H04J 14/02* (2006.01)
*H04B 10/40* (2013.01)
*H04B 10/80* (2013.01)

(52) U.S. Cl.
CPC ......... *H04B 10/27* (2013.01); *H04B 10/40* (2013.01); *H04B 10/807* (2013.01); *H04J 14/02* (2013.01); *H04J 14/0265* (2013.01); *H04J 14/0282* (2013.01); *H04J 14/0297* (2013.01)

(58) Field of Classification Search
CPC .................................. H04J 14/02; H04J 14/08
See application file for complete search history.

(56) References Cited

U.S. PATENT DOCUMENTS

| | | | | |
|---|---|---|---|---|
| 2007/0098319 | A1* | 5/2007 | Jennen ............... | G02B 6/12021 385/17 |
| 2011/0033187 | A1* | 2/2011 | Rossetti .................. | H04J 14/02 398/79 |
| 2011/0052189 | A1* | 3/2011 | Yamada .............. | H04J 14/0279 398/42 |
| 2013/0089319 | A1* | 4/2013 | Grobe ................. | H04J 14/0227 398/7 |
| 2013/0188950 | A1* | 7/2013 | Sakauchi ............ | H04J 14/0208 398/48 |
| 2014/0029951 | A1* | 1/2014 | Handelman ............. | H04J 14/02 398/91 |
| 2014/0056371 | A1* | 2/2014 | Ji ........................ | H04L 27/2697 375/260 |

(Continued)

OTHER PUBLICATIONS

Ma, Y., et al., "Demonstration of a 40Gb/s Time and Wavelength Division Multiplexed Passive Optical Network Prototype System," OFC/NFOEC Postdeadline Papers, 2012, 3 pages.

(Continued)

*Primary Examiner* — Danny Leung
(74) *Attorney, Agent, or Firm* — Conley Rose, P.C.

(57) ABSTRACT

An apparatus comprising an arrayed waveguide grating (AWG) comprising a plurality of AWG ports, a power splitter comprising a plurality of splitter ports, and a plurality of optical interleavers, each coupled to a respective AWG port and a respective splitter port, for directing incoming optical signals to one of the AWG and the power splitter.

15 Claims, 12 Drawing Sheets

(56) References Cited

U.S. PATENT DOCUMENTS

| | | | | |
|---|---|---|---|---|
| 2014/0093232 A1* | 4/2014 | Hood | .................... | H04B 10/032 398/5 |
| 2014/0294391 A1* | 10/2014 | Tamaki | .................... | H04L 12/12 398/68 |
| 2014/0314414 A1* | 10/2014 | Cheng | .................... | H04J 14/02 398/68 |

OTHER PUBLICATIONS

Kani, J., et al., "Energy Efficient Optical Access Network Technologies," OSA/OFC/NFOEC, 2011, 3 pages.

Kani, J., "Energy-Efficient Optical Access Networks: Issues and Technologies," Topics in Optical Communications, IEEE Communication Magazine, Feb. 2013, pp. S22-S26.

Hara, K., et al., "Flexible load balancing technique using dynamic wavelength bandwidth allocation (DWBA) toward 100Gbit/s-class-wdm/TDM-PON," ECOC, Sep. 19-23, 2010, 3 pages.

Cheng, N., et al., "Flexible TWDM PON with Load Balancing and Power Saving," ECOC, Sep. 22-26, 2013, 3 pages.

Cheng, N., et al., "Flexible TWDM PON system with pluggable optical transceiver modules," Optics Express, Jan. 27, 2014, 13 pages.

Chanclou, P., et al., "Network Operator Requirements for the Next Generation of Optical Access Networks," IEEE Network, Mar./Apr. 2012, 7 pages.

"Series G: Transmission Systems and Media, Digital Systems and Networks, Digital sections and digital line system—Optical line systems for local and access networks, 40-Gigabit-capable passive optical networks (NG-PON2): General requirements," ITU-T, G.989.1, Mar. 2013, 26 pages.

"Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks," IEEE Std 802.3ah, Sep. 7, 2004, 640 pages.

"Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks," IEEE Computer Society, IEEE Std 802.3av, Oct. 30, 2009, 236 pages.

Series G: Transmission Systems and Media, Digital Systems and Networks, Digital sections and digital line system—Optical line systems for local and access networks, Broadband optical access systems based on Passive Optical Networks (PON), ITU-T, G.983.1, Jan. 2005, 124 pages.

"Series G: Transmission Systems and Media Digital Systems and Networks, Digital sections and digital line systems—Optical Line Systems for Local and Access networks, ONT Management and control interface specification for B-PON," ITU-T, G.983.2, 370 pages.

"Series G: Transmission Systems and Media, Digital Systems and Networks, Digital sections and digital line system—Optical line systems for local and access networks, A broadband optical access system with increased service capability by wavelength allocation," ITU-T, G.983.3, Mar. 2001, 59 pages.

"Series G: Transmission Systems and Media, Digital Systems and Networks, Digital sections and digital line system—Optical line systems for local and access networks, A Broadband optical access system with increased service capability using dynamic bandwidth assignment," ITU-T, G.983.4, Nov. 2011, 92 pages.

"Series G: Transmission Systems and Media, Digital Systems and Networks, Digital sections and digital line system—Optical line systems for local and access networks, A broadband optical access system with enhanced survivability," ITU-T, G.983.5, Jan. 2002, 60 pages.

"Series G: Transmission Systems and Media, Digital Systems and Networks, Digital sections and digital line system—Optical line systems for local and access networks, Gigabit-capable passive optical networks (GPON): General characteristics," ITU-T, G.984.1, Mar. 2008, 43 pages.

"Series G: Transmission Systems and Media, Digital Systems and Networks, Digital sections and digital line system—Optical line systems for local and access networks, Gigabit-capable passive optical networks (GPON): Physical Media Dependent (PMD) layer specification," ITU-T, G.984.2, Mar. 2003, 38 pages.

"Series G: Transmission Systems and Media, Digital Systems and Networks, Digital sections and digital line system—Optical line systems for local and access networks, Gigabit-capable Passive Optical Networks (G-PON): Transmission convergence layer specification," ITU-T, G.984.3, Mar. 2008, 146 pages.

"Series G: Transmission Systems and Media, Digital Systems and Networks, Digital sections and digital line system—Optical line systems for local and access networks, Gigabit-capable Passive Optical Networks (G-PON): ONT management and control interface specification," ITU-T, G.984.4, Feb. 2008, 430 pages.

"Series G: Transmission Systems and Media, Digital Systems and Networks, Digital sections and digital line system—Optical line systems for local and access networks, Gigabit-capable Passive Optical Networks (G-PON): Enhancement hand," ITU-T, G.984.5, Sep. 2007, 22 pages.

"Series G: Transmission Systems and Media, Digital Systems and Networks, Digital sections and digital line system—Optical line systems for local and access networks, Gigabit-capable passive optical networks (GPON): Reach extension," ITU-T, G.984.6, Mar. 2008, 40 pages.

"Series G: Transmission Systems and Media, Digital Systems and Networks, Digital sections and digital line system—Optical line systems for local and access networks, Gigabit-capable passive optical networks (GPON): Long reach," ITU-T, G.984.7, Jul. 2010, 14 pages.

Draft new Recommendation ITU-T G.989.3 (for Consent, Apr. 4, 2014), Study Group 15, TD 200 Rev.1 (PLEN/15) Mar. 24-Apr. 4, 2014, 167 pages.

Draft New Recommendation ITU-T G.989.2, Telecommunication Standardization Sector, TD 170 Rev.2 (PLEN/15), Mar. 24-Apr. 4, 2014, 112 pages.

Office Action dated Oct. 9, 2015, 8 pages, U.S. Appl. No. 14/257,458, filed Apr. 21, 2014.

Office Action dated Dec. 9, 2015, 14 pages, U.S. Appl. No. 14/257,458, filed Apr. 21, 2014.

Notice of Allowance dated Apr. 20, 2016, 11 pages, U.S. Appl. No. 14/257,458, filed Apr. 21, 2014.

* cited by examiner

FLEXIBLE TWDM PON WITH LOAD BALANCING AND POWER SAVING

CROSS-REFERENCE TO RELATED APPLICATIONS

This application is a continuation of U.S. patent application Ser. No. 14/257,458, filed on Apr. 21, 2014 by Ning Cheng et al. and entitled "Flexible TWDM PON with Load Balancing and Power Saving," which claims priority to U.S. Provisional Patent Application No. 61/814,085 filed Apr. 19, 2013 by Ning Cheng et al. and entitled "Flexible TWDM PON with Load Balancing and Power Saving", both of which are incorporated herein by reference in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Rapid growth of internet traffic, driven by the proliferation of video services, continues to push broadband optical access networks for higher data rates and better quality of services. A passive optical network (PON) is a system for providing network access over "the last mile." In a downstream direction, the PON may be a point-to-multi-point (P2MP) network comprising an optical line terminal (OLT) at a central office (CO), a plurality of optical network units (ONUs) at customer premises, and an optical distribution network (ODN) connecting the OLT and the ONUs. PONs may also comprise remote nodes (RNs) located between the OLTs and the ONUs, for example, at the end of a road where multiple users reside. In recent years, time division multiplexing (TDM) PONs and wavelength division multiplexing (WDM) PONs have been deployed in order to increase bandwidth. In TDM PONs, each ONU may send and receive data across every available wavelength, but only at dedicated time intervals. In WDM PONs, each ONU may send and receive data in a continuous manner, but only at dedicated wavelengths. A hybrid PON combining TDM with WDM can support higher capacity so that an increased number of users can be served by a single OLT with sufficient bandwidth per user. In such a time and wavelength division multiplexed (TWDM) PON, a WDM PON may be overlaid on top of a TDM PON. In other words, multiple wavelengths may be multiplexed together to share a single feeder fiber, and each wavelength may be shared by multiple users using TDM. However, TWDM PONs present design and cost issues that need be addressed.

SUMMARY

In one embodiment, the disclosure includes an apparatus comprising an arrayed waveguide grating (AWG) comprising a plurality of AWG ports, a power splitter comprising a plurality of splitter ports, and a plurality of optical interleavers, each coupled to a respective AWG port and a respective splitter port, for directing incoming optical signals to one of the AWG and the power splitter.

In another embodiment, the disclosure includes a method of optical communication implemented by an OLT comprising a first set of transceivers and a second set of transceivers, the method comprising communicating with a first set of ONUs via a first ODN using the first set of transceivers, communicating with a second set of ONUs via a second ODN using the second set of transceivers, and tuning at least one transceiver in the first set of transceivers such that the at least one tuned transceiver communicates with at least some of the second set of ONUs.

In yet another embodiment, the disclosure includes, in a PON, an apparatus comprising an OLT comprising a plurality of transceiver modules configured to communicate with a plurality of sets of ONUs, each set of ONUs communicated via a respective one of a plurality of ODNs, the plurality of transceiver modules comprising at least one TWDM transceiver module, and an AWG comprising at least one AWG port, each AWG port coupled to a respective TWDM transceiver module, wherein the at least one TWDM transceiver module is configured to communicate with the plurality of sets of ONUs through the AWG.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
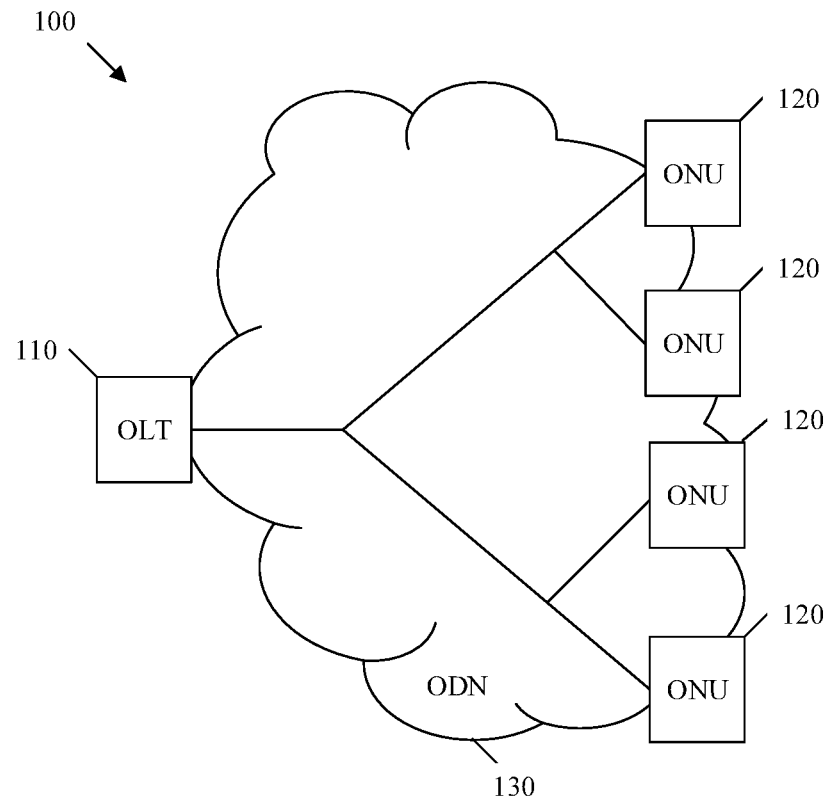
FIG. 1 is a schematic diagram of an embodiment of a PON.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

There exist various PON protocols or standards, for example, including asynchronous transfer mode PON (APON) and the broadband PON (BPON) defined by the International Telecommunication Union (ITU) Telecommunication Standardization Sector (ITU-T) G.983 standard, Gigabit PON (GPON) defined by the ITU-T G.984 standard, and Ethernet PON (EPON) defined by the Institute of Electrical and Electronics Engineers (IEEE) 802.3ah standard. Currently, GPON and EP ON have been deployed worldwide for broadband services, providing aggregated bandwidth up to 2.5 Gigabits per second (Gb/s). To satisfy ever-increasing bandwidth demands from end users, next generation 10 Gigabits (10G) PON, sometimes known as XG-PON or 10G EPON with aggregated bandwidth of 10 Gb/s have been standardized and are ready for large scale deployment. Beyond 10G PONs, future generations of optical access technologies, such as WDM PON, TWDM PON, Orthogonal Frequency Division Multiplexed (OFDM) PON and Optical Code Division Multiplexed (OCDM) PON, has been proposed and demonstrated with aggregated bandwidth of 40 Gb/s or higher.

Among these technologies, TWDM PON has been selected by the Full Service Access Network (FSAN) community as a primary broadband solution for future access networks. Such TWDM PON systems can provide 40 Gb/s aggregated capacity with 1:64 splitting ratio and 40 kilometers (km) reach, meeting operators' requirements for future broadband services. A new set of standards on TWDM PON is being released or expects to be released by ITU-T paving the way for future large scale deployment. With multiple wavelengths and wavelength tunability, TWDM PON allows enhanced network functionalities unavailable in previous generations of pure PONs. Incremental bandwidth upgrade and load balancing may b e achieved in TWDM PON systems using tunable transmitters on an OLT line card. Energy efficient solutions in TWDM PONs have been demonstrated with dynamic wavelength routing.

Disclosed herein are embodiments of a flexible TWDM PON architecture to allow improvement of various implementations, such as pay-as-you-grow in capacity, load balancing among different ODNs, protection again transceiver failure, and power saving at OLT. In an embodiment, a hybrid device comprising a cyclic AWG, a power splitter, and a plurality of optical interleavers may be inserted between a central office (e.g., in an OLT) and ONUs. Based on wavelengths, the interleavers may direct optical signals to either an AWG port or a splitter port. Since optical signals entering an AWG port may be directed to one ODN, while optical signals entering a splitter port may be directed to multiple ODNs, wavelength tuning may allow a transceiver module, originally serving one ODN, to serve other ODNs as well. With mainly passive components added, the flexible TWDM PON system disclosed herein supports pay-as-you-grow deployment of OLT transceiver modules and smooth upgrade of the aggregated capacity in each ODN. Load balancing for improved network performance may be achieved in one ODN and among different ODNs with flexible lambda ($\lambda$) connections, e.g., to provide bandwidth wherever is needed among multiple ODNs. Furthermore, selective OLT sleep or turn-off for power saving may be supported with narrow wavelength tuning, e.g., 100 Gigahertz (GHz), in OLT transceivers. Hence, the flexible TWDM PON system exhibits enhanced functionalities and offers more flexibility compared to conventional PON systems. In addition, this flexible TWDM PON achieves power saving at OLT side and provides improved resilience against OLT transceiver failures.

FIG. 1 is a schematic diagram of an embodiment of a PON 100. The PON 100 comprises an OLT 110, a set of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. In an embodiment, the PON 100 may be a Next Generation Access (NGA) system, such as an XGPON, which may have a downstream bandwidth of about 10 Gb/s and an upstream bandwidth of at least about 2.5 Gb/s. Alternatively, the PON 100 may be an EPON, a 10 Gigabit EPON, an APON, a BPON, a GPON, a WDM PON, a TDM PON, or a TWDM PON, or combinations thereof.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be located at a central location, such as a central office, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of active components, such as optical amplifiers. The ODN 130 may extend from the OLT 110 to the ONUs 120 in a branching configuration as shown in FIG. 1, but may be alternatively configured in any other point-to-multi-point configuration.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110.

Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to/from a customer device. In some embodiments, ONUs 120 and optical network terminals (ONTs) are similar, and thus the terms are used interchangeably herein. The ONUs 120 may be typically located at distributed locations, such as the customer premises, but may be located at other locations as well.

Figure 2:
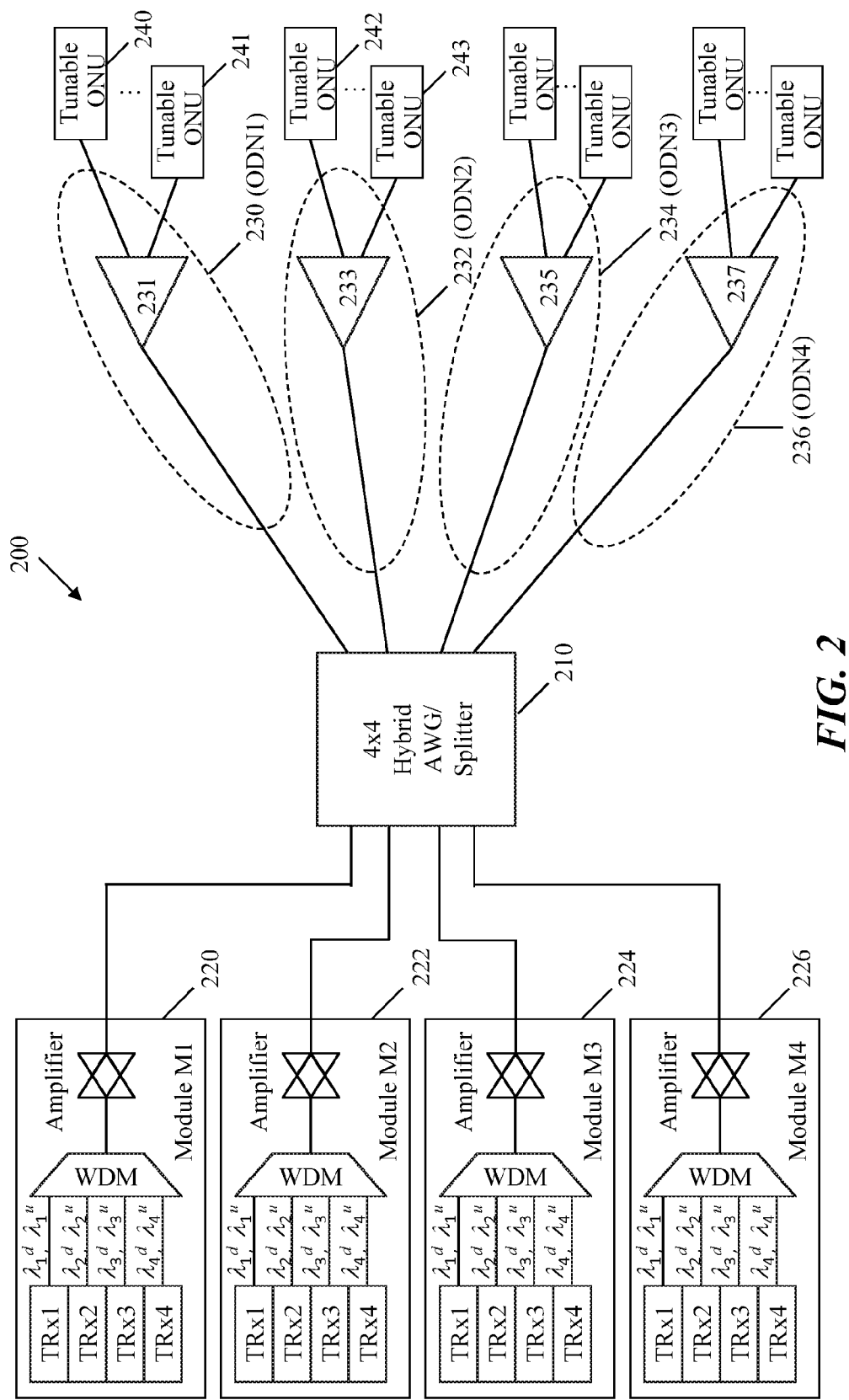
FIG. 2 is a schematic diagram of an embodiment of a TWDM PON architecture.

FIG. 2 is a schematic diagram of an embodiment of a TWDM PON architecture 200, which may have long-reach and/or large splitting. For example, the TWDM PON architecture 200 may have an increased maximum transmission distance, e.g. greater than about 20 km. The TWDM PON architecture 200 may also have an increased splitting ratio, e.g. greater than about 1:64. Compared to a conventional TWDM PON, a hybrid device 210 is inserted between one or more OLTs and a plurality of ODNs. In an embodiment, the device 210 comprises an AWG (e.g., a cyclic AWG with 200 GHz channel spacing) and a power splitter coupled together, thus the device 210 is sometimes referred to as a hybrid AWG/splitter 210. The architecture 200 may achieve 20 km or longer reach and 1:64 splitting ratio with optical amplifiers in the CO. The TWDM PON architecture 200 may further comprise a plurality of OLT transceiver modules 220, 222, 224, and 226, which may be located in one OLT (e.g., the OLT 110 in FIG. 1) or in different OLTs. Each transceiver module may communicate with the hybrid AWG/splitter 210. Each transceiver module may comprise one or more transceivers (TRx), which includes transmitter (Tx) and/or receiver (Rx). Each transceiver module may be implemented using any suitable manner for downstream and upstream communications.

The TWDM PON architecture 200 may further comprise a plurality of ODNs 230, 232, 234, and 236, which may be similar to the ODN 130. Each of the ODNs 230, 232, 234, and 236 may be coupled to a set of ONUs. For example, a first set of ONUs including tunable ONUs 240 and 241 may be coupled to the ODN 230, while a second set of ONUs including tunable ONUs 242 and 243 may be coupled to the ODN 232. Each ODN may comprise a splitter (e.g., a 1:64 splitter) and other suitable components (e.g., fiber). For example, the ODNs 230, 232, 234, and 236 may comprise 1:64 splitters 231, 233, 235, and 237, respectively as shown in FIG. 2. Depending on the application, the hybrid AWG/splitter 210 may sometimes be considered part of an ODN, e.g., when the hybrid AWG/splitter 210 is deployed at a remote node.

A set of ONUs may include any suitable number of tunable or fixed ONUs, and each ONU may be similar to an ONU 120. Each transceiver in a transceiver module may communicate with a set of ONUs via the hybrid AWG/splitter 210 and via a respective ODN. For example, a transceiver in the transceiver module 220 may communicate with the first set of tunable ONUs 240 and 241. Although FIG. 2 shows four transceiver modules denoted as M1-M4, four ODNs denoted as ODN1-ODN4, and four sets of ONUs for illustrative purposes, one of ordinary skill in the art will understood that any other number of transceiver modules, ODNs, and ONUs may be similarly used.

Figure 3:
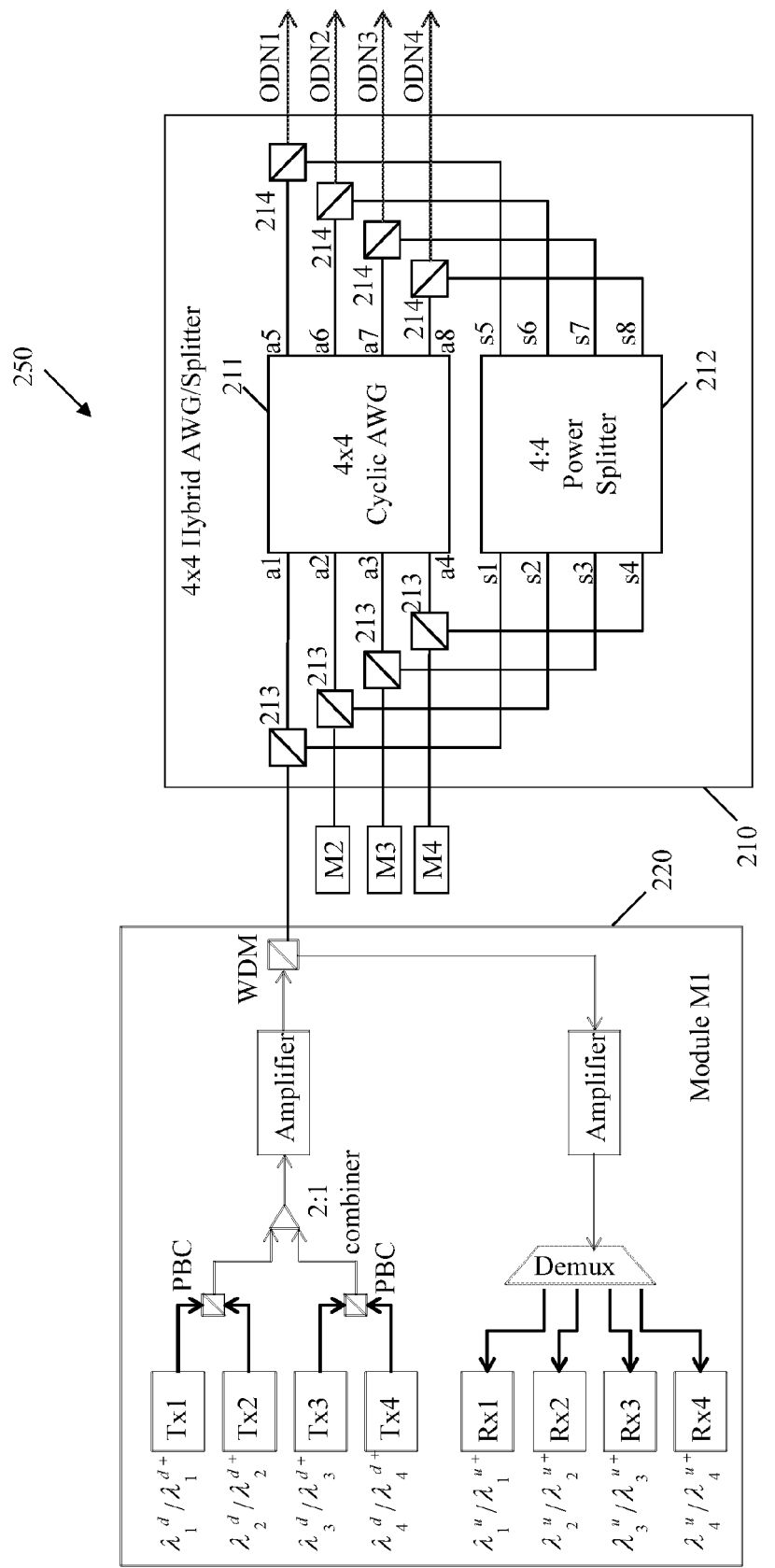
FIG. 3 illustrates an embodiment of an architecture, which represents part of the TWDM PON architecture shown in FIG. 2.

FIG. 3 illustrates an embodiment of an architecture 250, which represents part of the TWDM PON architecture 200 shown in FIG. 2. The architecture 250 comprises the hybrid AWG/splitter 210 and the plurality of OLT transceiver modules 220, 222, 224, and 226. The hybrid AWG/splitter 210 may reside in a central office or at a remote node. In an embodiment, the hybrid AWG/splitter 210 may comprise a 4×4 cyclic AWG 211, a 4×4 power splitter 212, and a plurality of optical interleavers 213 and 214 arranged as shown in FIG. 3. The cyclic AWG 211 may comprise a plurality of AWG ports denoted as a1-a8 with multiple input ports and multiple output ports, and the power splitter 212 may comprise a plurality of splitter ports denoted as s1-s8. The cyclic nature of the AWG 211 may allow it to repeat orders and can work in a predefined channel band with certain channel spacings. Each optical interleaver may couple to a respective AWG port and a respective splitter port for directing incoming optical signals to either the AWG 211 or the power splitter 212. In an embodiment, the AWG 211 and the power splitter 212 may be configured to communicate with a plurality of sets of ONUs via a plurality of ODNs, wherein each set of ONUs is communicated via a respective ODN. Optical signals entering an input port (e.g., a1) of the AWG 211 may be directed to one ODN, while optical signals entering an input port of the power splitter 212 may be directed to two or more of the ODNs.

Take the transceiver module 220 as an example, transmitters (Tx1-Tx4) may be used for downstream communication and receivers (Rx1-Rx4) may be used for upstream communication. In the downstream direction, four EMLs may transmit downstream signals at 10 Gb/s at four wavelengths denoted as $\lambda_1^d$, $\lambda_2^d$, $\lambda_3^d$, and $\lambda_4^d$. The wavelengths may have a channel spacing of 200 GHz. The EMLs may be tuned (e.g., thermally or by any other tuning method) by 100 GHz and emit at another wavelength set denoted as $\lambda_1^{d+}$, $\lambda_2^{d+}$, $\lambda_3^{d+}$ and $\lambda_4^{d+}$. The wavelengths may be tuned in the same direction, either up or down.

A wavelength-independent combiner may be used to multiplex four transmitter wavelengths. Such a wavelength-independent combiner may comprise a polarization beam combiner (PBC) and a 3 decibel (dB) coupler. Because interleavers 213 and 214 may be 100 GHz interleavers, the wavelength set $\{\lambda_1^d, \lambda_2^d, \lambda_3^d \text{ and } \lambda_4^d\}$ with channel spacing of 200 GHz may go through the cyclic AWG 211, and each wavelength may be distributed to a different ODN (e.g., $\lambda_1^d$ from module M1 may go to ODN1, $\lambda_2^d$ from module M2 may go to ODN2, etc.). As the same wavelength from different modules may go to different outputs of the cyclic AWG 211, each ODN may get a unique wavelength set $\{\lambda_1^d, \lambda_2^d, \lambda_3^d, \text{ and } \lambda_4^d\}$. On the other hand, the tuned wavelength set $\{\lambda_1^{d+}, \lambda_2^{d+}, \lambda_3^{d+} \text{ and } \lambda_4^{d+}\}$ may pass through the power splitter 212 and the wavelengths may be distributed to all four ODNs. Alternatively, the system may be designed such that untuned wavelength set $\{\lambda_1^d, \lambda_2^d, \lambda_3^d \text{ and } \lambda_4^d\}$ goes through the power splitter 212, and tuned wavelength set $\{\lambda_1^{d+}, \lambda_2^{d+}, \lambda_3^{d+} \text{ and } \lambda_4^{d+}\}$ goes through the cyclic AWG 211.

In an embodiment, a transceiver module (M1) may transmit optical signals with a first set of wavelengths that are directed by an optical interleaver 213 to the respective AWG port (a1). M1 may also transmit optical signals with a second set of wavelengths that are directed by the same optical interleaver 213 to the respective splitter port (s1). The second set of wavelengths are shifted up or down with respect to the first set of wavelengths. For example, each wavelength in the first set of wavelengths and each wavelength in the second set of wavelengths may be separated by a substantially equal channel spacing (e.g., about 200 GHz). The second set of wavelengths are shifted with respect to the first set of wavelengths by half of the channel spacing (e.g., about 100 GHz).

Similarly, in upstream transmissions, ONU wavelengths may need to be tuned to two sets of wavelengths, first set being $\{\lambda_1^u, \lambda_2^u, \lambda_3^u$ and $\lambda_4^u\}$ and second set being $\{\lambda_1^{u+}, \lambda_2^{u+}, \lambda_3^{u+}$ and $\lambda_4^{u+}\}$, where both sets of wavelengths may have a channel spacing of 200 GHz and the second set of wavelengths may be shifted 100 GHz up/down with respect to the first set. Wavelength set $\{\lambda_1^u, \lambda_2^u, \lambda_3^u,$ and $\lambda_4^u\}$ may pass through the cyclic AWG 211 and the other set $\{\lambda_1^{u+}, \lambda_2^{u+}, \lambda_3^{u+},$ and $\lambda_4^{u+}\}$ may pass through the power splitter 212, or vice versa. In the receiver portion of the OLT transceiver module 220, a demultiplexer (demux) may have a 200 GHz bandwidth, so one receiver may receive both $\lambda^u$, the original wavelength, and $\lambda^{u+}$, the shifted or tuned wavelength. A narrowly tuned filter inside a receiver optical subassembly (ROSA) may select either $\lambda^u$ or $\lambda^{u+}$.

Advantages of the architecture 250 may include pay-as-you-grow approach for bandwidth evolution, load balancing, on-demand bandwidth provisioning, power saving, and resilience against OLT transceiver failure, which are further discussed below. TWDM PONs may be considered as the future of optical access following 10G PON systems and may need to be backward compatible with such legacy PONs. It may be desirable that the transition from such legacy PONs to TWDM PONs be smooth and without service interruptions. The disclosed embodiments may support pay-as-you-grow deployment of 40G TWDM PONs.

FIGS. 4A-4D are schematic diagrams illustrating a pay-as-you-grow deployment according to an embodiment of the disclosure. For example, four 10G PONs may have been deployed, although any other PON can be used. As the user bandwidth demand increases, upgrading to 40G TWDM PONs may be needed. A straightforward approach would be deploying four 40G TWDM PONs on day one; however, such deployment may be initially too costly and 40 Gb/s may be initially greater than bandwidth demand. Accordingly, capacity may be increased gradually from 10 Gb/s to 20 Gb/s, then from 20 Gb/s to 30 Gb/s, and eventually to the full capacity of a 40G TWDM PON.

Figure 4A:
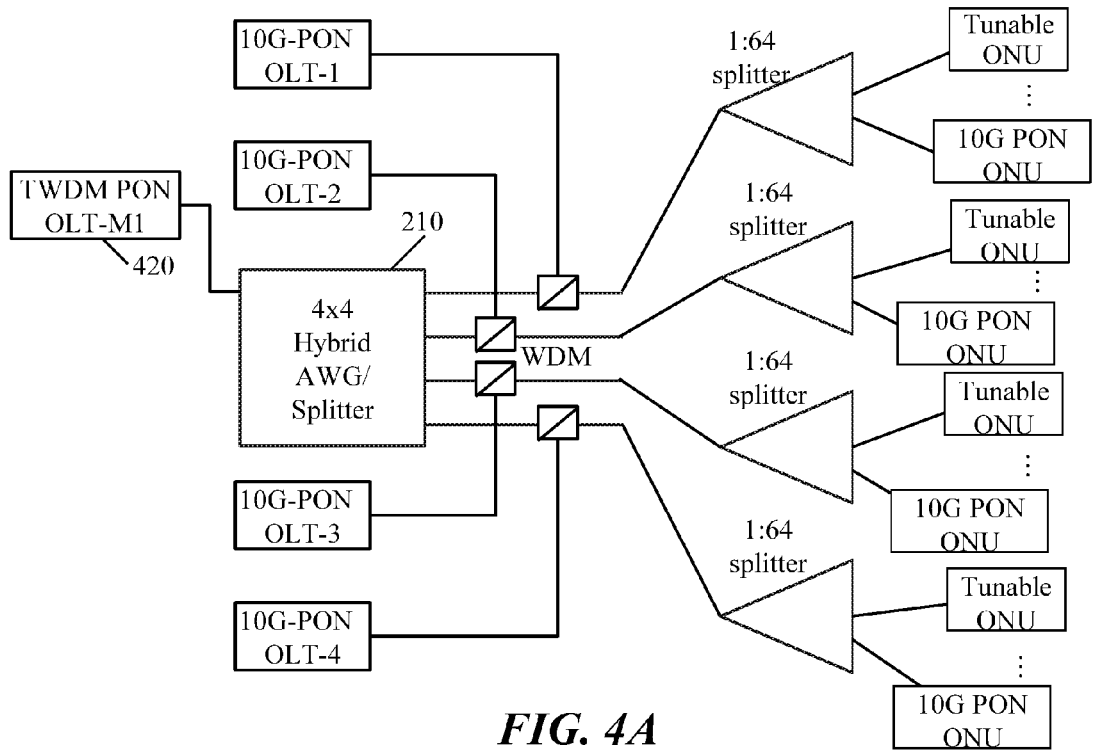
FIGS. 4A-4D are schematic diagrams illustrating a pay-as-you-grow deployment according to an embodiment of the disclosure.

Referring to FIG. 4A, as the user bandwidth increases, an OLT transceiver module 420 for a TWDM PON may be activated. The transceiver module 420 may be the same as or similar to the transceiver module 220. Suppose the transceiver module 420 has 40 Gb/s capacity. Four wavelengths from the 40 Gb/s transceiver module 420, each with 10 Gb/s, may be separated by a 4×4 cyclic AWG (e.g., the AWG 211). The cyclic AWG is located inside the hybrid AWG/splitter 210, which may be deployed in a CO. Each wavelength may then serve a separate ODN. Combined with the original 10G PON system, the total capacity for each ODN may reach 20 Gb/s.

Figure 4B:
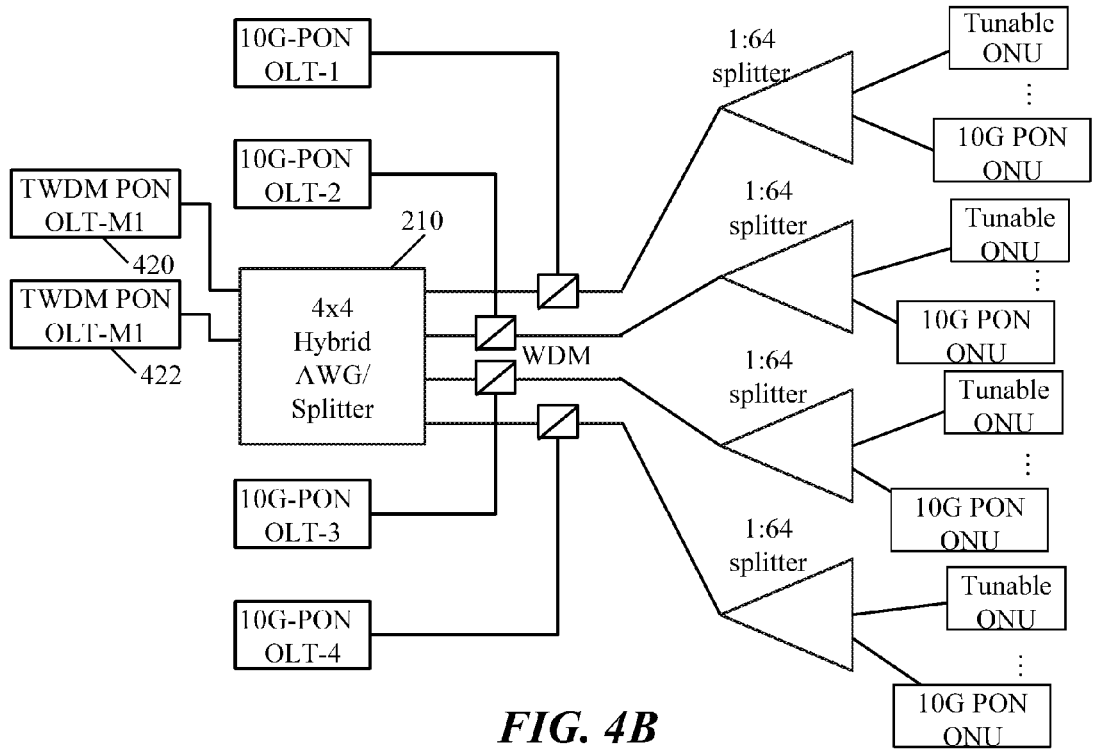
Figure 4C:
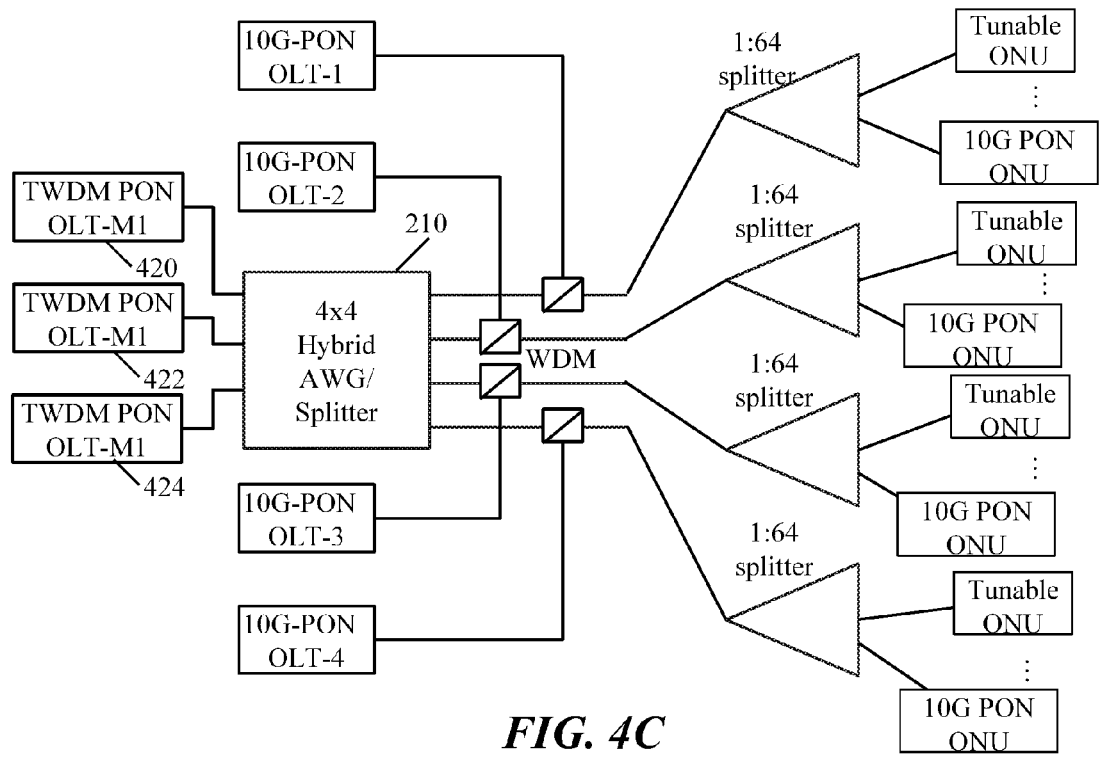
Figure 4D:
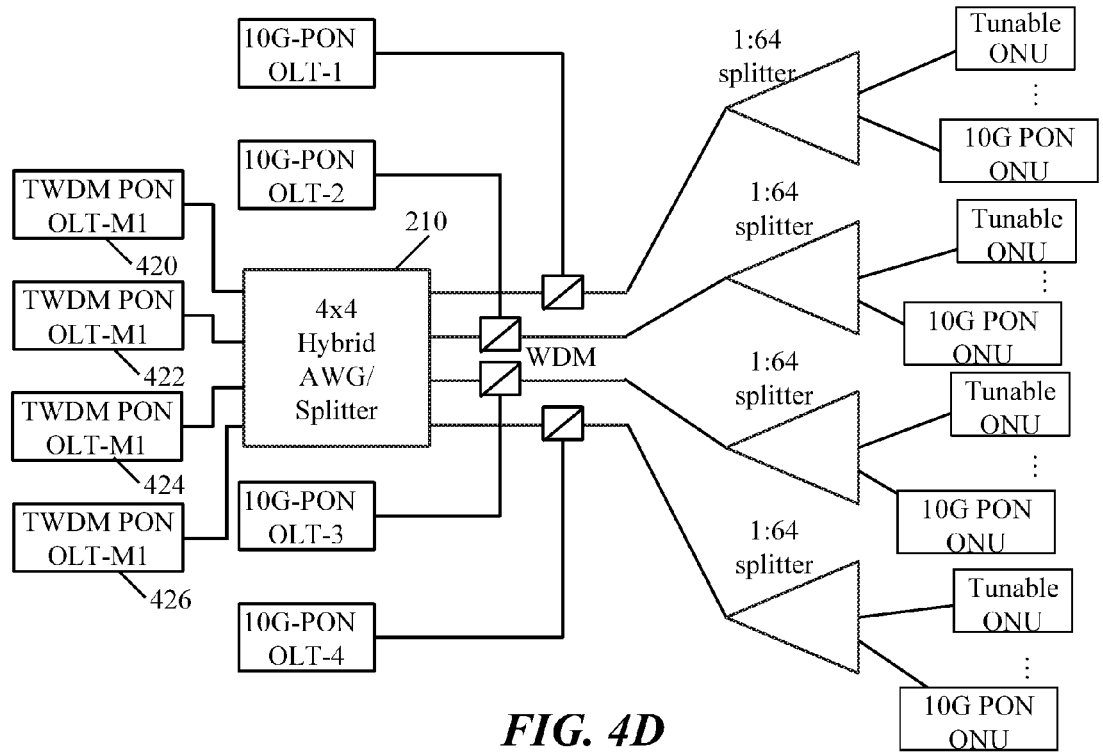

Referring to FIG. 4B, as the user bandwidth increases further, a second TWDM PON transceiver module 422 may be activated in the CO. Again, four wavelengths from the transceiver module 422 may be separated by the cyclic AWG to serve four different ODNs. Suppose the transceiver module 422 also has 40 Gb/s capacity, the total capacity of each ODN may then increase to 30 Gb/s. As shown in FIG. 4C, a third TWDM PON transceiver module 424 may be activated in the CO. Again, four wavelengths from the transceiver module 424 may be separated by the cyclic AWG to serve four different ODNs. If the transceiver module 424 also has 40 Gb/s capacity, the total capacity of each ODN may then increase to 40 Gb/s. Similarly, as shown in FIG. 4D, a fourth TWDM PON transceiver module 426 may be gradually added to meet the increasing bandwidth demands. Eventually, a total capacity of 50 Gb/s may be achieved with 40G TWDM PONs plus the original 10G PON.

Figure 4E:
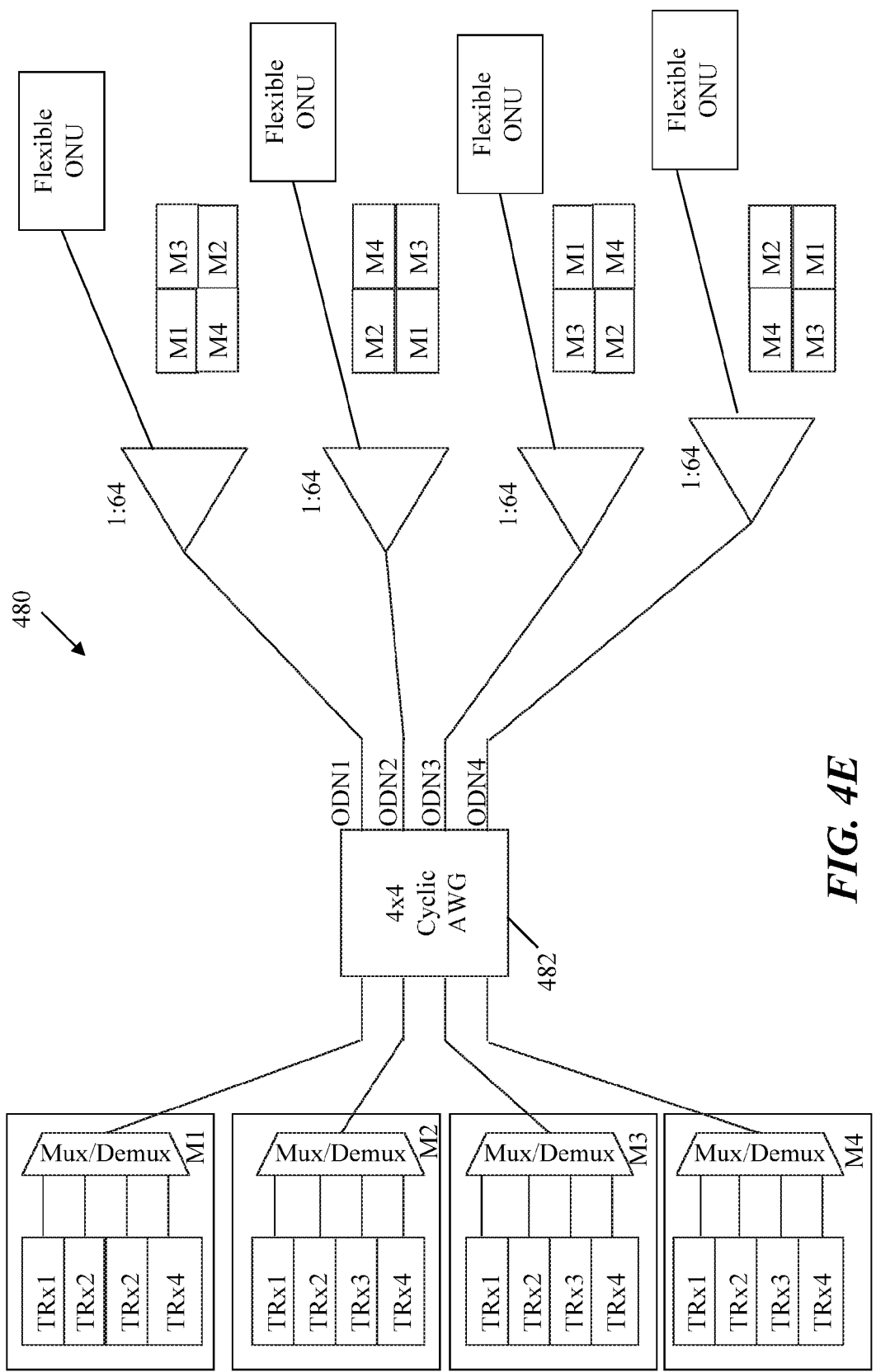
FIG. 4E is a schematic diagram illustrating another embodiment of a TWDM PON architecture.

FIG. 4E is a schematic diagram illustrating a TWDM PON architecture 480 according to an embodiment of the disclosure, which may be used for pay-as-you-grow deployment. Compared with other architectures, the architecture 480 includes a cyclic AWG 482 but does not need a power splitter. One of ordinary skill in the art will understand, based on this disclosure, that the 4×4 splitter and the interleavers in the hybrid AWG/splitter can be removed without affecting the pay-as-you-grow deployment.

In an embodiment, a manufacturer or service provider may implement an OLT and an AWG for pay-as-you-grow deployment. The AWG 482 may comprise at least one AWG port, each AWG port coupled to a respective TWDM transceiver module. The OLT may comprise a plurality of transceiver modules, including M1-M4, configured to communicate with a plurality of sets of ONUs, each set of ONUs communicated via a respective one of a plurality of ODNs. The plurality of transceiver modules may comprise at least one TWDM transceiver module, which may be configured to communicate with all sets of ONUs through the AWG. Legacy PON module that is not TWDM based, such as 10G PON, WDM PON, TDM PON, etc., may also be included in the OLT. Then at least one TWDM transceiver module may tune optical signal wavelengths of transceivers to communicate with all sets of ONUs through all ODNs, including ODNs coupled to the legacy PON modules.

In TWDM PONs, each ONU may be equipped with tunable transceivers, so load balancing is possible within a single ODN. For instance, if traffic load in a specific downstream/upstream wavelength pair is too heavy, then a certain number of ONUs using this wavelength pair may switch to another pair with less traffic load. In the present disclosure, an ONU may be equipped with a fast tunable DBR laser. Assuming that a 125 microsecond (μs) upstream frame is adopted in the TWDM PON (the same can be used in GPON/XG-PON), load balancing within the TWDM PON may be achieved burst-by-burst using the tunable DBR laser.

Figure 5:
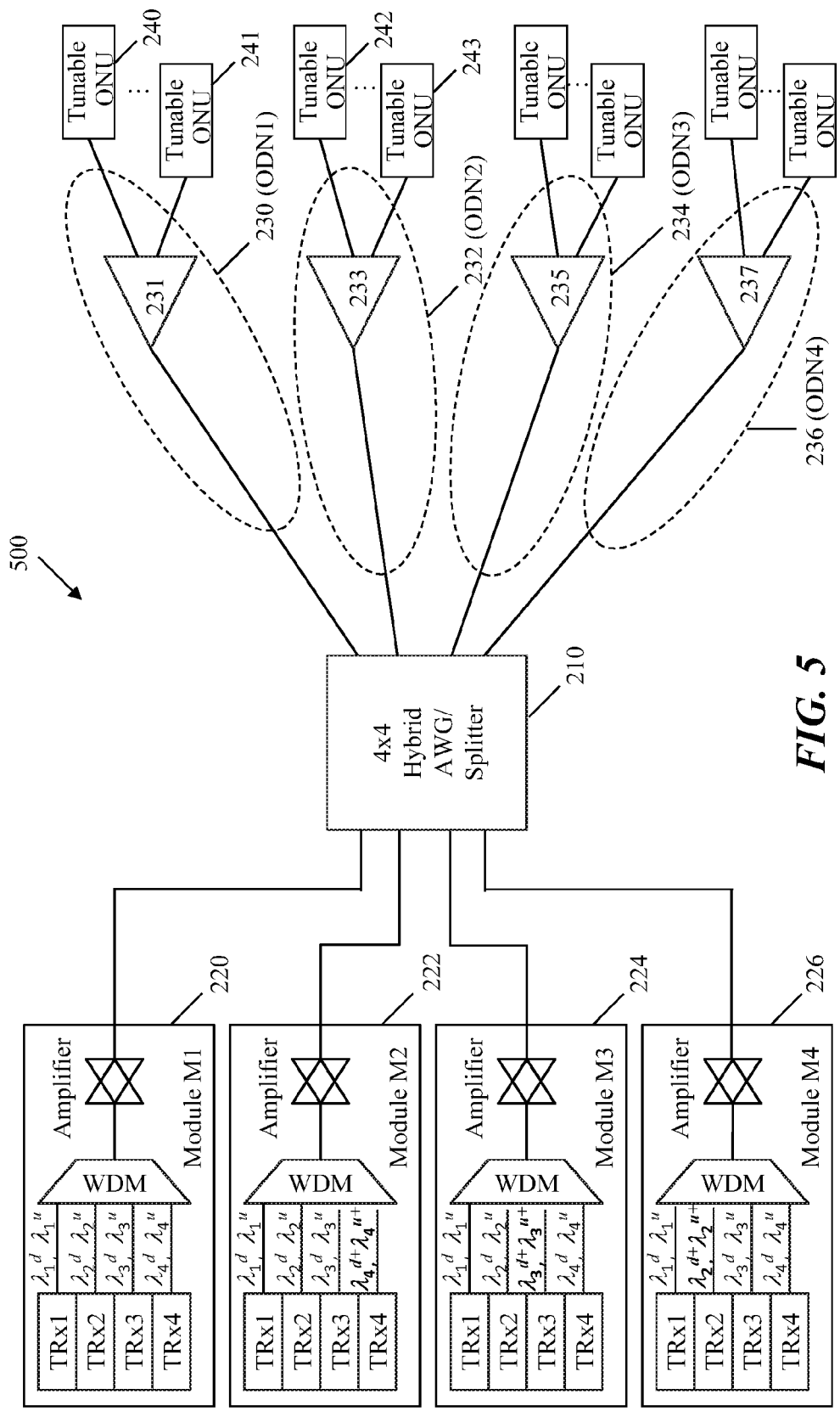
FIG. 5 is a schematic diagram illustrating a load balancing scheme according to an embodiment of the disclosure.

FIG. 5 is a schematic diagram illustrating a load balancing scheme 500 according to an embodiment of the disclosure. In addition to load balancing within a single ODN, the disclosed embodiments may allow load balancing among different ODNs. As shown in FIG. 2 above, suppose that initially a set of four wavelengths with 200 GHz spacing, $\lambda_1^d$(M1), $\lambda_2^d$(M4), $\lambda_3^d$(M3) and $\lambda_4^d$(M2), where M1, M2, M3 and M4 represent which module the wavelength is from, may serve a first ODN (ODN1). Another set of four wavelengths, $\lambda_1^d$(M2), $\lambda_2^d$(M1),) $\lambda_3^d$(M4) and $\lambda_4^d$(M3), may serve a second ODN (ODN2), and so on. In other words, a first set of transceivers including TRx1 in M1, TRx4 in M2, TRx3 in M3, and TRx2 in M4 may communicate with a first set of ONUs via the first ODN. A second set of transceivers including TRx1 in M2, TRx2 in M1, TRx3 in M4, and TRx2 in M3 may communicate with a second set of ONUs via the second ODN. Further, suppose that, for a specific period of time, the traffic load in ODN1 is relatively low (e.g., data traffic below a certain pre-set or dynamic threshold, which can be any suitable value), and that a single wavelength is sufficient to serve the users in ODN1 for a total capacity of 10 Gb/s. In this case, one wavelength, e.g., $\lambda_1^d$(M1), may serve ODN1 while other wavelengths in the OLT may be set as idle or may serve other ODNs.

For example, ODN2 may have relatively heavy traffic (e.g., data traffic above a certain pre-set or dynamic threshold, which can be any suitable value), and that a set of four wavelengths with a total capacity of 40 Gb/s may not be enough to support the user bandwidth demand. In this case, the wavelengths including $\lambda_2^d$(M4), $\lambda_3^d$(M3), and $\lambda_4^d$(M2), which normally serve ODN1 but became idle because of the low traffic load in ODN1, may now be shifted by 100 GHz to $\lambda_2^{d+}$(M4), $\lambda_3^{d+}$(M3), and $\lambda_4^{d+}$(M2), as shown in FIG. 5. Thus, tuning transceivers, including TRx4 in M2, TRx3 in M3, and TRx2 in M4, in the first set of transceivers allows the first set of transceivers to communicate with the second set of ONUs via the second ODN. Wavelength shifting may be realized via thermal tuning or any other method. After tuning, the downstream wavelengths $\lambda_2^{d+}$(M4), $\lambda_3^{d+}$(M3), and $\lambda_4^{d+}$(M2) may pass through a power splitter (e.g., the splitter 212) instead of a cyclic AWG (e.g., the AWG 211) and thus reach ODN2. In other words, the wavelengths $\lambda_2^{d+}$(M4), $\lambda_3^{d+}$(M3), and $\lambda_4^{d+}$(M2) may be used to serve users in ODN2. Tuning a transceiver may be implemented by any suitable entity such as a processor, a hardware tuner, or a software tuner. Tuning may cause optical signals, originally directed to one of the AWG and the power splitter, to be redirected to the other of the AWG and the power splitter. In some embodiments, for simplicity the power splitter may be replaced by optical fibers.

Similarly, if load balancing is desirable in the upstream direction (e.g., for similar traffic conditions), ONUs in ODN2 with wavelengths of $\lambda_2^u$, $\lambda_3^u$, and $\lambda_4^u$ may be tuned to $\lambda_2^{u+}$, $\lambda_3^{u+}$ and $\lambda_4^{u+}$, respectively, as shown in FIG. 5. The upstream wavelengths $\lambda_2^{u+}$, $\lambda_3^{u+}$, and $\lambda_4^{u+}$ may also pass through a power splitter (e.g., the splitter 212) instead of a cyclic AWG (e.g., the AWG 211) and reach corresponding receivers at the OLT. Correspondingly, tunable filter inside the RSOAs for Rx2 (M4), Rx3 (M3), and Rx4 (M2) may be tuned to $\lambda_2^{u+}$, $\lambda_3^{u+}$, and $\lambda_4^{u+}$. By doing so, three additional wavelength pairs may be used to serve ODN2. Thus, the total capacity in ODN2 may be increased from 40 Gb/s to 70 Gb/s.

In addition to load balancing, since tuning wavelength may allow a transceiver module to serve more than one ODN, the same technique may be used to provide resilience against transceiver failures at the OLT. If a transceiver or a transceiver module (take M2 as an example) fails, the wavelengths of OLT transceiver module M1 can be tuned from the original wavelength set $\{\lambda_1^d, \lambda_2^d, \lambda_3^d$ and $\lambda_4^d\}$ to a shifted wavelength set $\{\lambda_1^{d+}, \lambda_2^{d+}, \lambda_3^{d+}$ and $\lambda_4^{d+}\}$, so that transceiver module M1 can serve both ODN1 and ODN2 (and other ODNs if necessary). Therefore, OLT transceiver protection can be achieved in the flexible TWDM PON architectures. Furthermore, power saving at the OLT may be demonstrated using EMLs with 100 GHz thermal tuning range. The disclosed embodiments may save power at the OLT and improve the resilience of the PON through power splitting instead of wavelength routing.

Figure 6:
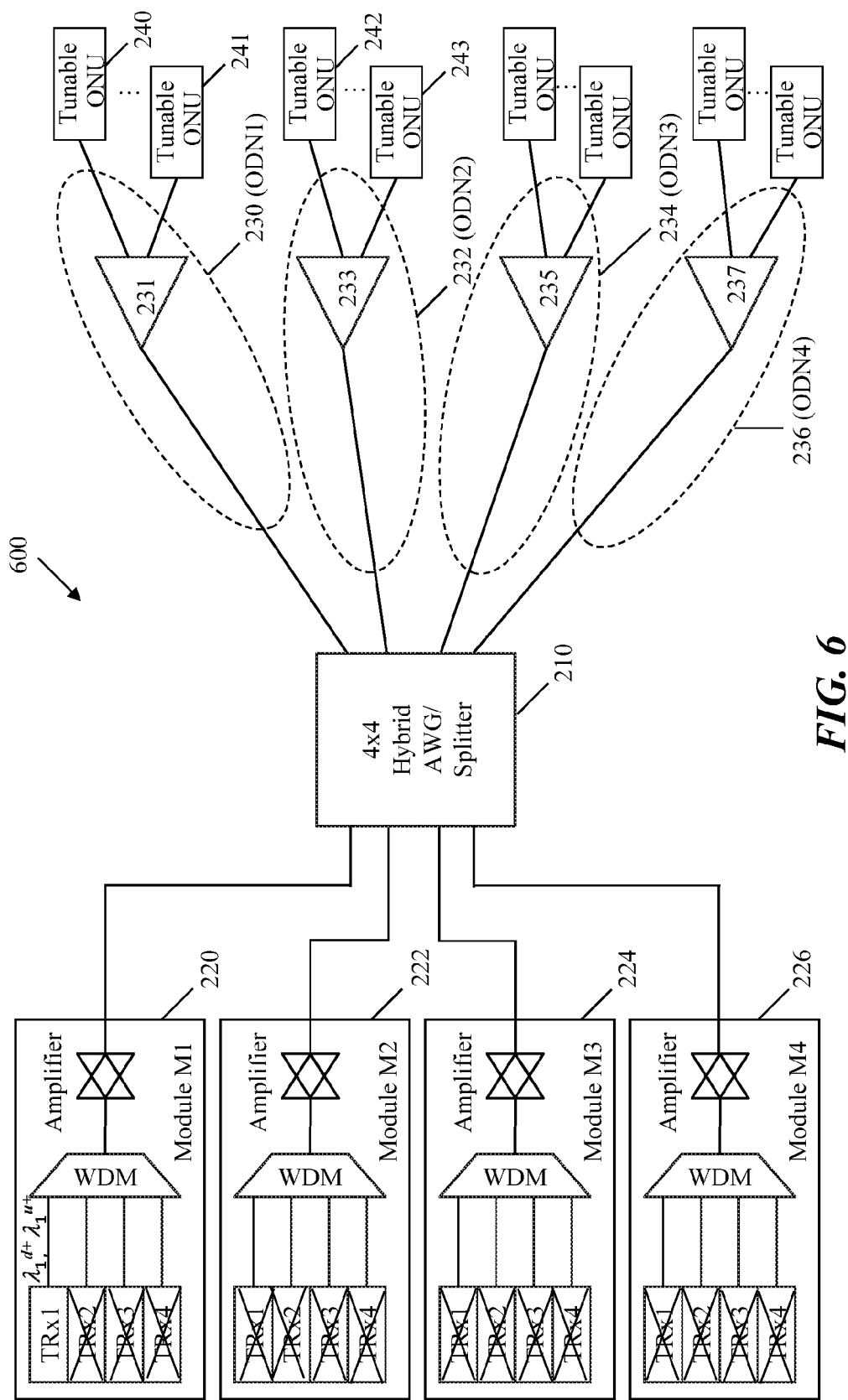
FIG. 6 is a schematic diagram illustrating a power saving scheme according to an embodiment of the disclosure.

FIG. 6 is a schematic diagram illustrating a power saving scheme 600 according to an embodiment of the disclosure. Suppose that the traffic load is relatively low e.g., below a certain level, in one ODN or across multiple ODNs, a portion of the transceivers may be shut off. In an embodiment, all but one wavelength in an OLT is shutoff. For example, the power saving scheme 600 may turn off all transceivers in the second transceiver module M2 even though that the corresponding ODN (ODN2) still has some traffic. As shown in FIG. 6, a wavelength $\lambda_1^{d+}$ from the transceiver module M1 may remain active. That wavelength may have been shifted by 100 GHz from the original wavelength, $\lambda_1^d$(M1), so that $\lambda_1^{d+}$ may pass through the power splitter and reach all the users in the four ODNs. Similarly, in the upstream direction, if necessary all ONU transmitters may be tuned to wavelength $\lambda_1^{u+}$ so that the upstream wavelength from ODNs may pass through the power splitter and reaches the receiver in the OLT transceiver module M1.

The power saving scheme 600 is advantageous over conventional power saving techniques. As traffic load in an ODN decreases, an OLT in a conventional TWDM PON may reduce the number of activated wavelengths and shut off some of its transceivers. However, as long as there are any active users in the ODN, at least one wavelength in the OLT may need to remain active for that ODN. A conventional TWDM PON in a power saving mode may have four transceivers on to serve four different ODNs. In comparison, the disclosed embodiments may allow one transceiver being on to serve all four ODNs, hence this proposed architecture may improve power saving.

To demonstrate the feasibility of the disclosed flexible TWDM PON, an experimental test bed is built with the architecture shown in FIG. 2. For downstream, four 10 Gb/s EMLs with wavelengths on ITU grid at 1587.88, 1589.57, 1591.26, and 1592.95 nanometer (nm) are used at OLT side. These EMLs can be thermally tuned by 100 GHz to wavelengths at 1588.73, 1590.41, 1592.10, and 1593.79 nm, respectively. At ONU side, a thermally tuned optical filter is packaged inside ROSA to select one of the downstream wavelengths, and a three-section DBR laser with external modulation is used as the tunable transmitter for 10 Gb/s upstream transmission. The DBR laser wavelength can be tuned from 1530 to 1540 nm. With these upstream and downstream wavelengths, the disclosed TWDM PON can coexist with all legacy PON systems.

Figure 7A:
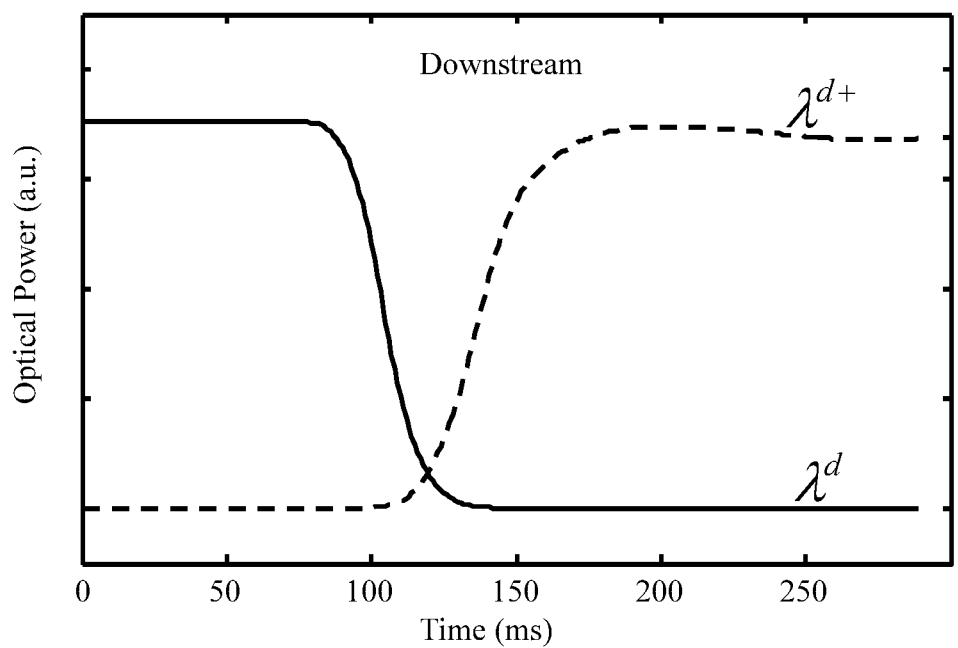
FIG. 7A shows test results for thermal tuning of electroabsorption modulated lasers (EMLs) at OLT.
Figure 7B:
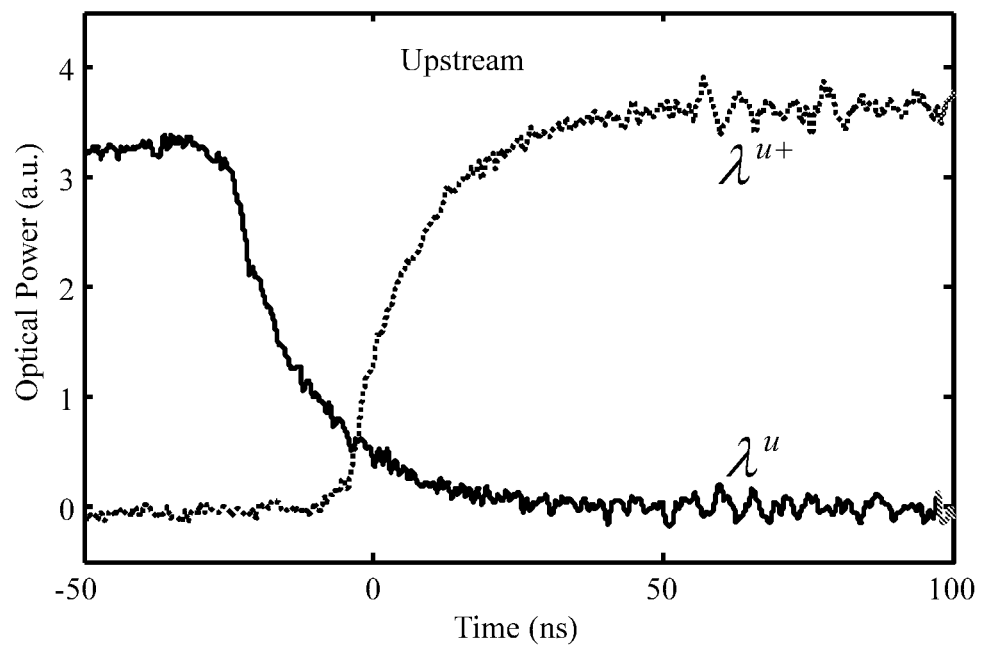
FIG. 7B shows test results for current tuning of distributed Bragg reflector (DBR) lasers at ONUs.

FIG. 7A shows test results for thermal tuning of EMLs at OLT, and FIG. 7B shows test results for current tuning of DBR lasers at ONUs. Two curves in FIG. 7A and FIG. 7B represent the received powers in two adjacent channels (100 GHz spacing) when the wavelength of the EML (DBR) is switched from $\lambda^d$ to $\lambda^{d+}$ in the downstream direction and from $\lambda^u$ to $\lambda^+$ in the upstream direction, respectively. The tuning speeds for EMLs and DBR lasers are about 80 milliseconds (ms) and 50 nanoseconds (ns) respectively. Test results include the respond time of the driving circuit inside the transceivers. Since each wavelength pair (for downstream and upstream) in the TWDM PON may serve a small number of users in a single ODN, the traffic could vary significantly within a short period of time due to the nature of the self-similar traffic from end users.

The 50 ns tuning speed of DBR laser is able to support fast load balancing within the same ODN for packet switching on a time scale of 125 microseconds (μs) (e.g., GPON/XG-PON frame cycle). On the other hand, the aggregated traffic load from an ODN may be the sum of traffic generated by a large number of end users (e.g. 64 users), so the variation of the aggregated traffic in a single ODN may be slower and the load balancing among different ODNs can be supported by the slower lambda switching. Slow tuning speed of thermal tuned EML, e.g., on the order of 100 ms, may provide the needed lambda flow among different ODNs in the flexible TWDM PON.

Figure 8A:
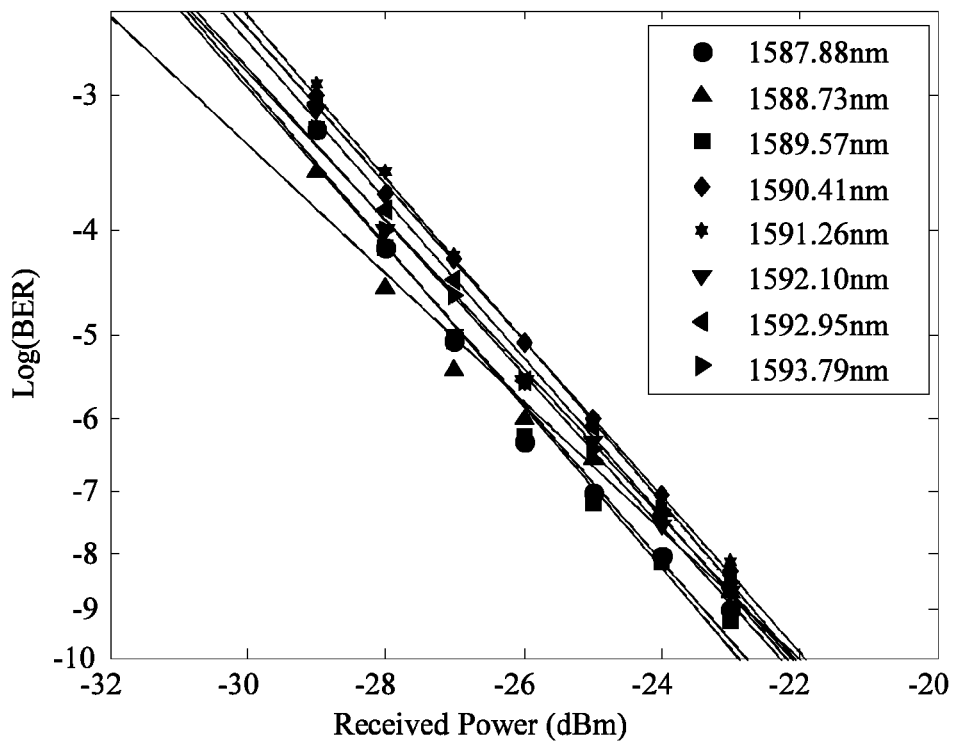
FIGS. 8A-8D show measurement results for bit error rates (BER) when testing transmission performance for downstream and upstream channels using the flexible TWDM PON disclosed herein.
Figure 8B:
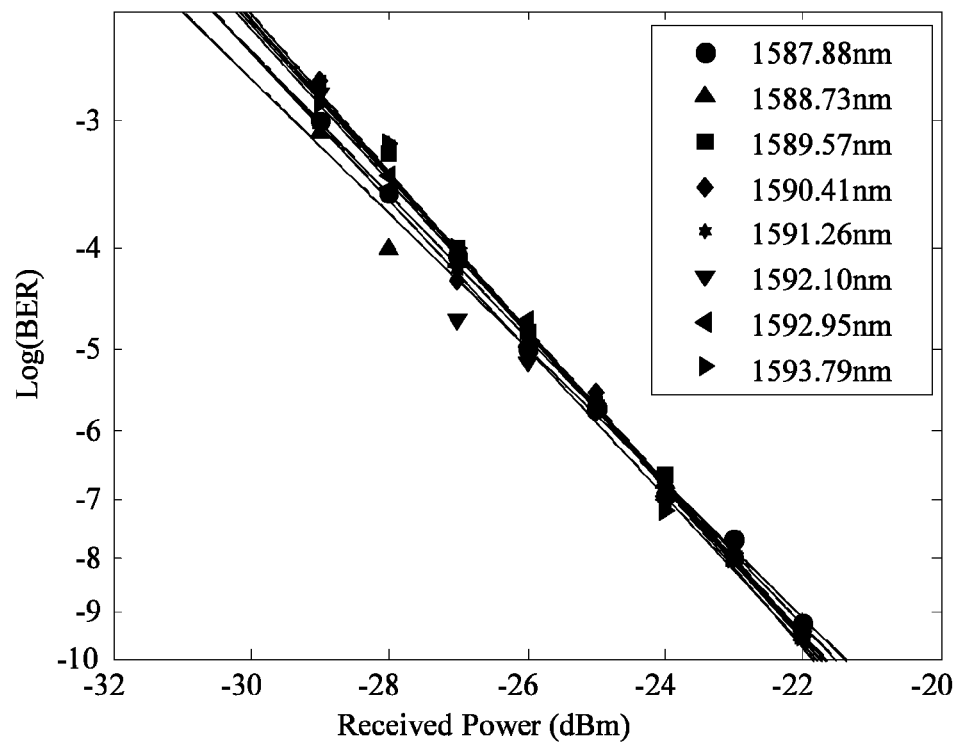
Figure 8C:
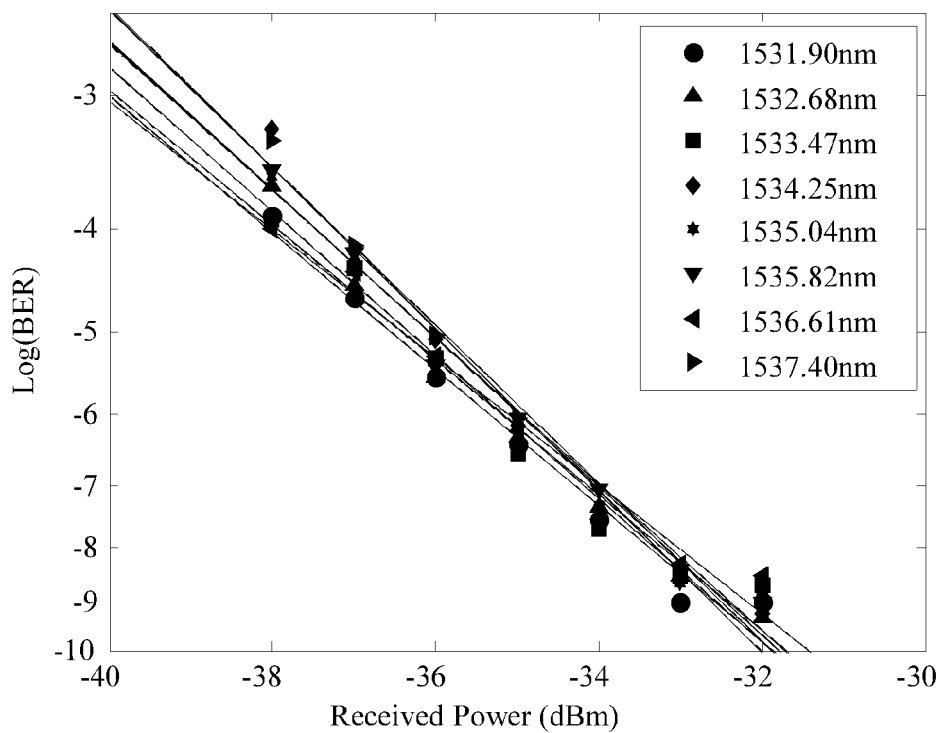
Figure 8D:
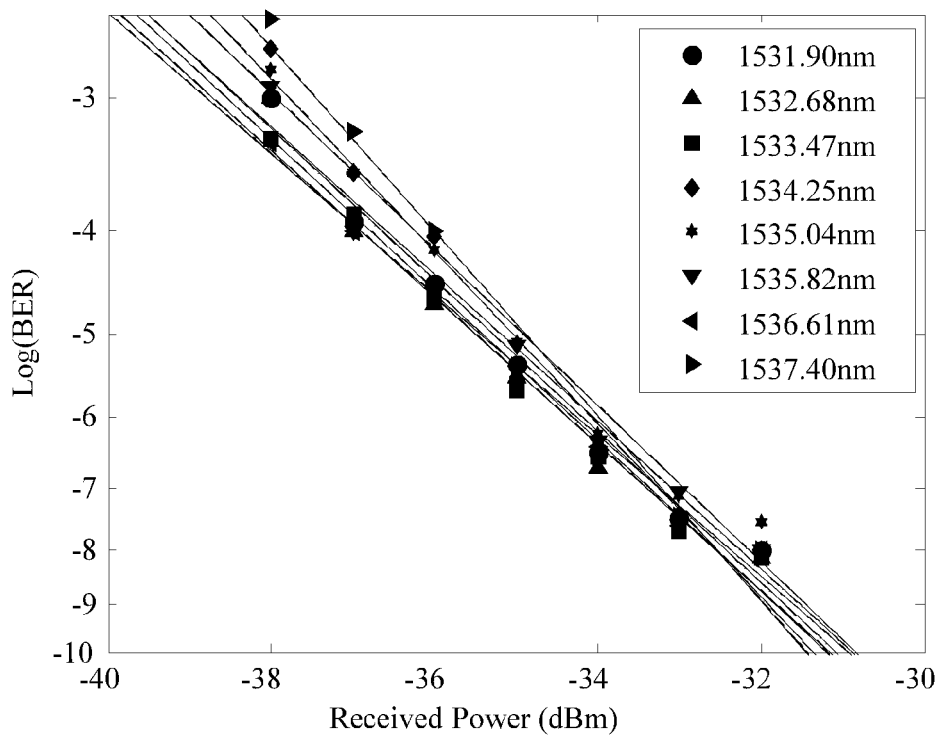

FIGS. 8A-8D show measurement results for bit error rates (BER) when testing the transmission performance for 10 Gb/s downstream and upstream channels using the flexible TWDM PON disclosed herein. After 20 km of standard single mode fiber, receiver sensitivity is better than −28 Decibel-milliwatts (dBm) (at BER=10$^{-3}$) for downstream, as shown in FIG. 8B. After 20 km of standard single mode fiber, receiver sensitivity is better than −36 dBm for upstream (at BER=10$^{-4}$), as shown in FIG. 8D. Compared to the downstream back-to-back case shown in FIG. 8A and the upstream back-to-back case shown in FIG. 8C, the power penalty is less than 1 dB for both upstream and downstream transmissions. With a booster amplifier at OLT, the transmitted power in each downstream channel may be a bout 10 dBm. For upstream, the transmitted power from each ONU is about 3 dBm. Hence, the power budget for downstream and upstream is more than about 38 dB, enough to support about 20 km reach and about 1:64 split after the hybrid AWG/splitter.

A flexible TWDM PON system is disclosed and demonstrated in an experimental test bed with 40 Gb/s capacity. With passive components added in ODNs, flexible TWDM PON system may allow pay-as-you-grow deployment at the OLT and smooth upgrade of the total capacity in each ODN. It supports dynamic bandwidth allocation within a single ODN as well as among different ODNs. Moreover, protection against transceiver failure and significant power saving can be achieved at OLT. Further details regarding disclosed embodiments are also present in an article entitled "Flexible TWDM PON with Load Balancing and Power Saving" and published on Sep. 22, 2013 by Ning Cheng et al., and in an article entitled "Flexible TWDM PON system with pluggable optical transceiver modules" and published on Jan. 24, 2014 by Ning Cheng et al. Both articles are incorporated herein by reference.

Figure 9:
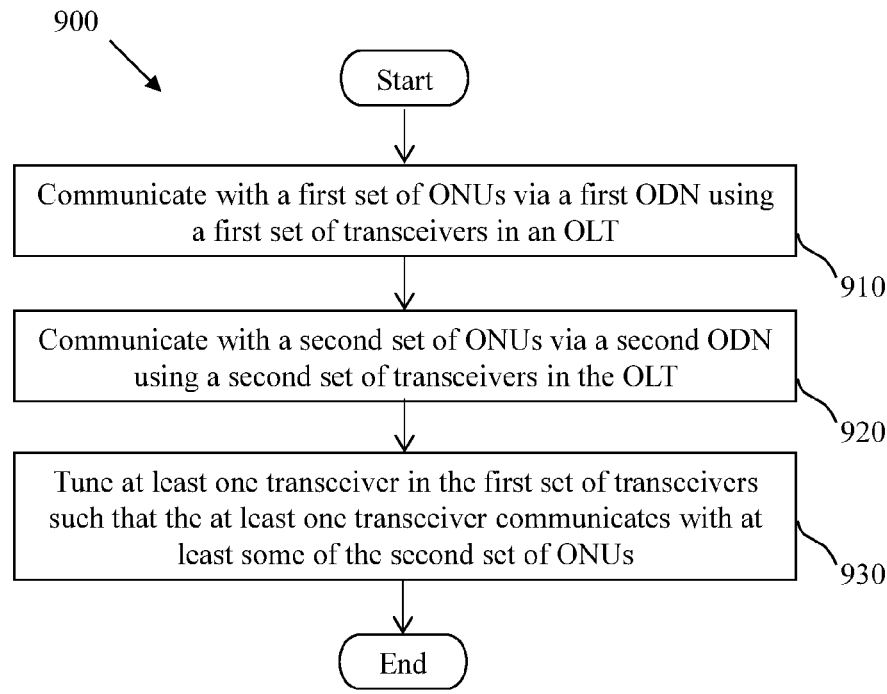
FIG. 9 is a flowchart illustrating an embodiment of an optical communication method.

FIG. 9 is a flowchart illustrating an embodiment of an optical communication method 900, which may be implemented by an OLT (e.g., the OLT 110), which may comprise a plurality of TWDM transceiver modules including a first set of transceivers and a second set of transceivers. Each set of transceivers may be located in one or more transceiver modules. The OLT may be coupled to a hybrid AWG/splitter (e.g., the hybrid device 210). The method 900 may be executed for various purposes such as a deployment known as pay-as-you-grow in capacity, load balancing among different ODNs, protection again transceiver failure, and power saving at OLT. In step 910, the method 900 may communicate with a first set of ONUs via a first ODN using the first set of transceivers. In step 920, the method 900 may communicate with a second set of ONUs via a second ODN using the second set of transceivers.

In step 930, the method 900 may tune at least one transceiver in the first set of transceivers such that the at least one tuned transceiver communicates with at least some of the second set of ONUs. In an embodiment, tuning at least one transceiver comprises shifting a first set of wavelengths to a second set of wavelengths using thermal tuning. The second set of wavelengths may be shifted with respect to the first set of wavelengths by half of the channel spacing (e.g., shifted about 100 GHz, half of channel spacing of about 200 GHz). Refer back to FIG. 5, which offers an example of the method 900. Corresponding to step 910, a first set of transceivers including TRx1 in M1, TRx4 in M2, TRx3 in M3, and TRx2 in M4 may communicate with a first set of ONUs via the first ODN. Corresponding to step 920, a second set of transceivers including TRx1 in M2, TRx2 in M1, TRx3 in M4, and TRx2 in M3 may communicate with a second set of ONUs via the second ODN. Corresponding to step 930, wavelength tuning may be performed on transceivers, including TRx4 in M2, TRx3 in M3, and TRx2 in M4, in the first set of transceivers such that the first set of transceivers communicates with the second set of ONUs via the second ODN.

It should be understood that FIG. 9 is for illustration purposes only, thus its steps can be realized or modified using various embodiments, and additional steps may be added whenever necessary. In an embodiment, communicating with the first set of ONUs in step 910 comprises transmitting optical signals with a first wavelength (an exemplary wavelength in a set) and directing optical signals with the first wavelength to an input port of a cyclic AWG. In this case, tuning the at least one transceiver in step 930 comprises shifting the first wavelength to a second wavelength such that the at least one transceiver transmits optical signals with the second wavelength to at least some of the second set of ONUs. Further, the method 900 may further direct optical signals with the second wavelength to an input port of a power splitter by using an optical interleaver, and wherein optical signals entering the power splitter are directed to both the first ODN and the second ODN.

In an embodiment for power saving, the method 900 may further determine that data traffic in the first ODN is below a first threshold and that data traffic in the second ODN is above a second threshold. In this case, tuning the at least one transceiver for load balancing in step 930 is based upon the data traffic in the first ODN being below the first threshold and the data traffic in the second ODN being above the second threshold.

In an embodiment for transceiver protection, the method 900 may further determine that one or more transceivers in the second set of transceivers have failed. In this embodiment, tuning the at least one transceiver in step 930 is based upon the determination of transceiver failure.

In an embodiment for power saving, the method 900 may further turn off transceivers in the second set of transceivers even though the corresponding second ODN has data traffic. In this embodiment, tuning the at least one transceiver in step 930 at least partially maintains data communication with the second set of ONUs via the second ODN.

Figure 10:
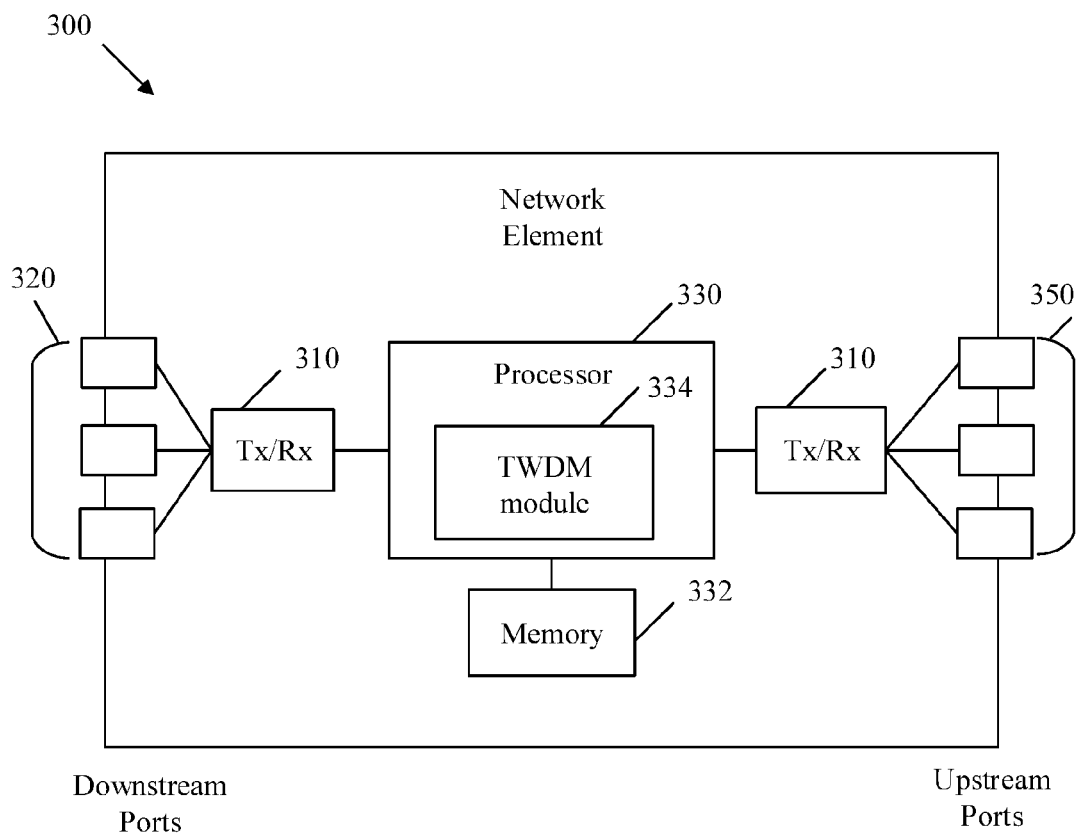
FIG. 10 is a schematic diagram of an embodiment of a network element (NE) within a PON.

FIG. 10 is a schematic diagram of an embodiment of an NE 300 within a PON, such as an OLT 110, ONU 120, transceiver modules 220-226, and/or ONUs 240-243. The NE 300 may be suitable for implementing one or more embodiments of systems, methods, and schemes disclosed herein, such as the load balancing scheme 500, the power saving scheme 600, and the method 900. The NE 300 may be configured to transmit and/or receive TWDM based transmissions over a multi-mode fiber. NE 300 may be implemented in a single node or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 300. For instance, the features/methods in the disclosure may be implemented using hardware, firmware, and/or software installed to run on hardware. The NE 300 may be any device that transports frames through a network, e.g., a switch, router, bridge, server, a client, etc. As shown in FIG. 10, the NE 300 may comprise transceivers (Tx/Rx) 310, which may be transmitters, receivers, or combinations thereof. A Tx/Rx 310 may be coupled to a plurality of downstream ports 320 (e.g. downstream interfaces) for transmitting and/or receiving frames from other nodes and a Tx/Rx 310 coupled to a plurality of upstream ports 350 (e.g. upstream interfaces) for transmitting and/or receiving frames from other nodes, respectively. A processor 330 may be coupled to the Tx/Rxs 310 to process the frames and/or determine which nodes to send frames to. The processor 330 may comprise one or more multi-core processors and/or memory devices 332, which may function as data stores, buffers, etc. Processor 330 may be implemented as a general processor or may be part of one or more application specific integrated circuits (ASICs) and/or digital signal processors (DSPs). Processor 330 may comprise a TWDM module 334, which may implement the methods discussed herein such as scheduling transmission timeslots, when the NE 300 is an OLT, or initiating transmissions based on schedule data, when NE 300 is an ONU. In an alternative embodiment, the TWDM module 334 may be implemented as instructions stored in memory 332, which may be executed by processor 330, or implemented in part in the processor 330 and in part in the memory 332. In another alternative embodiment, the TWDM module 334 may be implemented on separate NEs. The downstream ports 320 and/or upstream ports 350 may contain electrical and/or optical transmitting and/or receiving components.

It is understood that by programming and/or loading executable instructions onto the NE 300, at least one of the processor 330, TWDM module 334, Tx/Rxs 310, memory 332, downstream ports 320, and/or upstream ports 350 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose CPU inside a computer system) in a computer system (e.g., an OLT or an ONU) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (ROM) (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and random access memory (RAM)). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of optical communication implemented by an optical line terminal (OLT) comprising a first set of transceivers and a second set of transceivers, the method comprising:
   communicating with a first set of optical network units (ONUs) via a first optical distribution network (ODN) using the first set of transceivers by transmitting optical signals with a first wavelength and directing the optical signals with the first wavelength to an input port of a cyclic arrayed waveguide grating (AWG);
   communicating with a second set of ONUs via a second ODN using the second set of transceivers;
   tuning at least one transceiver in the first set of transceivers such that the at least one transceiver communicates with at least some of the second set of ONUs by shifting the first wavelength to a second wavelength such that the at least one transceiver transmits the optical signals with the second wavelength to at least some of the second set of ONUs; and
   directing the optical signals with the second wavelength to an input port of a power splitter by using an optical interleaver, the optical signals with the second wavelength entering the power splitter being directed to both the first ODN and the second ODN.

2. The method of claim 1, further comprising determining that data traffic in the first ODN is below a first threshold and that data traffic in the second ODN is above a second threshold, wherein tuning the at least one transceiver for load balancing is based upon the data traffic in the first ODN being below the first threshold and the data traffic in the second ODN being above the second threshold.

3. The method of claim 1, further comprising determining that one or more transceivers in the second set of transceivers have failed, wherein tuning the at least one transceiver is based upon the determination of transceiver failure.

4. The method of claim 1, further comprising turning off transceivers in the second set of transceivers when the corresponding second ODN has data traffic, wherein tuning the at least one transceiver for power saving at least partially maintains data communication with the second set of ONUs via the second ODN.

5. The method of claim 1, tuning the at least one transceiver comprises shifting a first set of wavelengths to a second set of wavelengths using thermal tuning, wherein each wavelength in the first set of wavelengths and each wavelength in the second set of wavelengths is separated by a substantially equal channel spacing, and wherein the second set of wavelengths are shifted with respect to the first set of wavelengths by half of the channel spacing.

6. An optical line terminal (OLT), comprising:
   a first set of transceivers configured to communicate with a first set of optical network units (ONUs) via a first optical distribution network (ODN); and
   a second set of transceivers configured to communicate with a second set of ONUs via a second ODN,
   a plurality of transceivers in the second set of transceivers being turned off when the second ODN has data traffic,
   at least one transceiver in the second set of transceivers at least partially maintaining data communication with the second set of ONUs via the second ODN when tuned for power saving, and
   at least one transceiver in the first set of transceivers being tuned such that the at least one transceiver communicates with at least some of the second set of ONUS.

7. The OLT of claim 6, wherein the first set of transceivers is configured to transmit optical signals with a first wavelength and directing the optical signals with the first wavelength to an input port of a cyclic arrayed waveguide grating (AWG), and wherein tuning the at least one transceiver comprises shifting the first wavelength to a second wavelength such that the at least one transceiver transmits the optical signals with the second wavelength to at least some of the second set of ONUs.

8. The OLT of claim 7, wherein the OLT is further configured to direct the optical signals with the second wavelength to an input port of a power splitter by using an optical interleaver, and wherein the optical signals entering the power splitter are directed to both the first ODN and the second ODN.

9. The OLT of claim 6, wherein the OLT is further configured to determine that data traffic in the first ODN is below a first threshold and that data traffic in the second ODN is above a second threshold, and wherein the at least one transceiver is tuned for load balancing based upon the data traffic in the first ODN being below the first threshold and the data traffic in the second ODN being above the second threshold.

10. The OLT of claim 6, wherein the OLT is further configured to determine that one or more transceivers in the second set of transceivers have failed, and wherein the at least one transceiver is tuned based upon the determination of transceiver failure.

11. The OLT of claim 6, wherein the at least one transceiver is tuned by shifting a first set of wavelengths to a second set of wavelengths using thermal tuning, wherein each wavelength in the first set of wavelengths and each wavelength in the second set of wavelengths is separated by a substantially equal channel spacing, and wherein the second set of wavelengths are shifted with respect to the first set of wavelengths by half of the channel spacing.

12. An apparatus for a passive optical network (PON), the apparatus comprising:
   an optical line terminal (OLT) comprising a plurality of transceiver modules configured to communicate with a plurality of sets of optical network units (ONUs), each set of ONUs communicated via a respective one of a plurality of optical distribution networks (ODNs), the plurality of transceiver modules comprising at least one time and wavelength division multiplexed (TWDM) transceiver module; and
   an arrayed waveguide grating (AWG) in communication with the OLT and comprising at least one AWG port, each AWG port coupled to a respective TWDM transceiver module,
   wherein the at least one TWDM transceiver module is configured to communicate with the plurality of sets of ONUs through the AWG.

13. The apparatus of claim 12, wherein the plurality of transceiver modules further comprises at least one legacy PON module that is not TWDM based, and wherein the at least one TWDM transceiver module is configured to tune optical signal wavelengths of transceivers to communicate with all the sets of ONUs through all ODNs, including ODNs coupled to the legacy PON module.

14. The apparatus of claim 12, further comprising:
   a power splitter comprising at least one splitter port, each splitter port coupled to a respective TWDM transceiver module; and
   at least one optical interleaver, each coupled to a respective TWDM transceiver module, a respective AWG port, and a respective splitter port, for directing optical signals from the TWDM transceiver module to one of the AWG and the power splitter.

15. The apparatus of claim 14, wherein the at least one TWDM transceiver module, in communication with the plurality of sets of ONUs, is configured to:
   communicate with a first set of ONUs via a first ODN; and
   tune at least one transceiver in the TWDM transceiver module such that the TWDM transceiver module communicates with at least a second set of ONUs via at least a second ODN, and
   wherein tuning the at least one transceiver causes optical signals, originally directed to one of the AWG and the power splitter, to be redirected to the other of the AWG and the power splitter.

* * * * *

UNITED STATES PATENT AND TRADEMARK OFFICE
CERTIFICATE OF CORRECTION

PATENT NO. : 9,967,033 B2  
APPLICATION NO. : 15/234680  
DATED : May 8, 2018  
INVENTOR(S) : Ning Cheng et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

In the Claims

Column 15, Lines 64-76, through Column 16, Lines 1-11, Claim 6 should read:
6. An optical line terminal (OLT), comprising:
    a first set of transceivers configured to communicate with a first set of optical network units (ONUs) via a first optical distribution network (ODN); and
    a second set of transceivers configured to communicate with a second set of ONUs via a second ODN,
    a plurality of transceivers in the second set of transceivers being turned off when the second ODN has data traffic,
    at least one transceiver in the second set of transceivers at least partially maintaining data communication with the second set of ONUs via the second ODN when tuned for power saving, and
    at least one transceiver in the first set of transceivers being tuned such that the at least one transceiver communicates with at least some of the second set of ONUs.

Signed and Sealed this  
Twenty-third Day of October, 2018

Andrei Iancu  
*Director of the United States Patent and Trademark Office*